United States Patent [19]
Motohashi

[11] Patent Number: 5,359,472
[45] Date of Patent: Oct. 25, 1994

[54] METHOD AND APPARATUS FOR IDENTIFYING SEGMENTS OF INFORMATION RECORDED ON DIGITAL AUDIO TAPE OR THE LIKE

[75] Inventor: Shigeo Motohashi, Oume, Japan
[73] Assignee: TEAC Corporation, Tokyo, Japan
[21] Appl. No.: 113,961
[22] Filed: Aug. 30, 1993

Related U.S. Application Data
[63] Continuation of Ser. No. 640,962, Jan. 14, 1991, abandoned.

[30] Foreign Application Priority Data
Jan. 16, 1990 [JP] Japan .................................... 2-6709

[51] Int. Cl.⁵ ...................... G11B 15/12; G11B 15/18; H04N 5/76; H04N 5/95
[52] U.S. Cl. .................................. 360/72.2; 360/74.4; 360/61; 358/335; 358/339; 358/342
[58] Field of Search .................... 360/10.1, 72.2, 74.1, 360/61; 358/342, 335, 339

[56] References Cited
U.S. PATENT DOCUMENTS

| | | | |
|---|---|---|---|
| 4,641,208 | 2/1987 | Inazawa et al. | 360/72.2 |
| 4,688,115 | 8/1987 | Takahashi et al. | 360/74.1 |
| 4,845,571 | 7/1989 | Hirano et al. | 360/72.2 |
| 4,894,732 | 1/1990 | Ueda | 360/10.1 |

FOREIGN PATENT DOCUMENTS
61-258357 11/1986 Japan .

Primary Examiner—Timothy P. Callahan
Assistant Examiner—Trong Phan
Attorney, Agent, or Firm—Woodcock Washburn Kurtz Mackiewicz & Norris

[57] ABSTRACT

A method of, and a system for, writing start marks in selected positions between tunes or like segments of information that have been recorded on digital audio tape, preparatory to the writing of serial program numbers in such selected positions. A position select switch is to be actuated for selecting a position on the tape between any two information segments when a transducer comes to such a position on the tape in the course of tape playback. The time code data that is read on the tape when the position select switch and which, therefore, represents the selected tape position is written on a random access memory built into a system controller of the apparatus and is further visibly displayed in hours, minutes, seconds and frames on display windows. Playback is continued for a preassigned brief time after the actuation of the position select switch. Then, with the transducer relatively returned to the selected tape position, a start mark is written in that position. The display windows continue the display of the selected tape position until the start mark is written. The system controller is additionally programmed to permit the amendment of the selected tape position and the confirmation of whether the selected, or amended, tape position is appropriate for writing a start mark and, later, a program number.

15 Claims, 11 Drawing Sheets

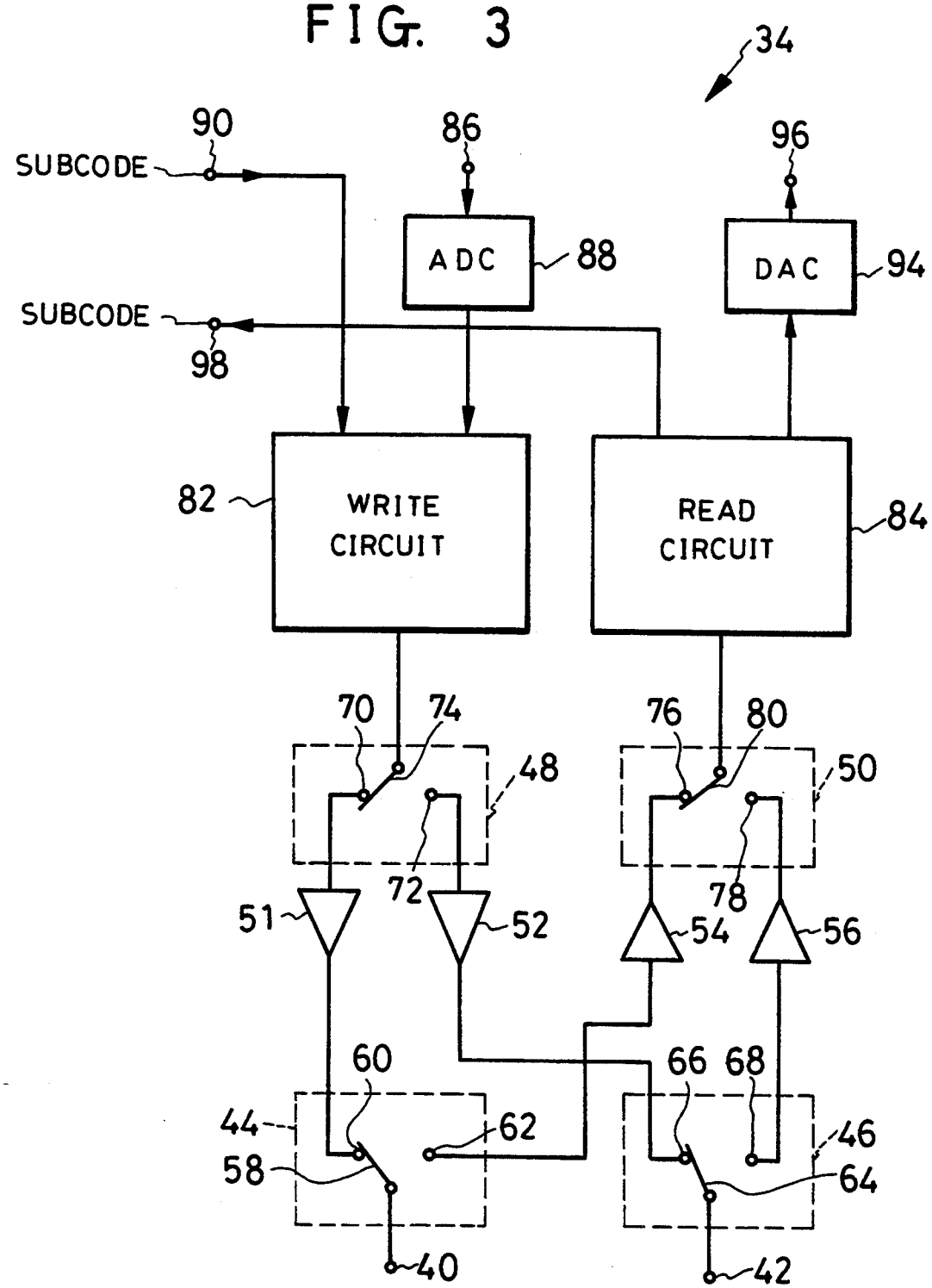

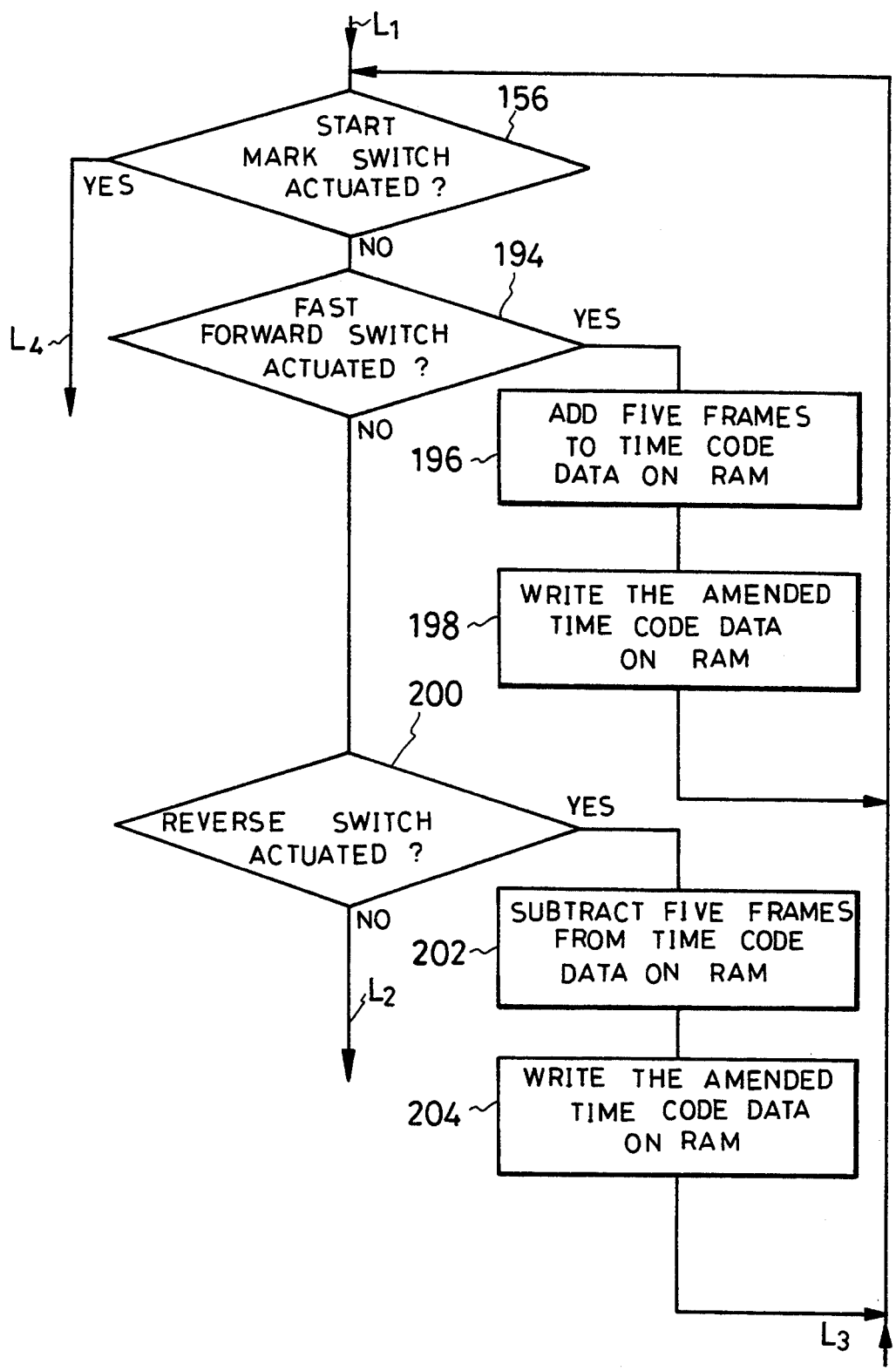

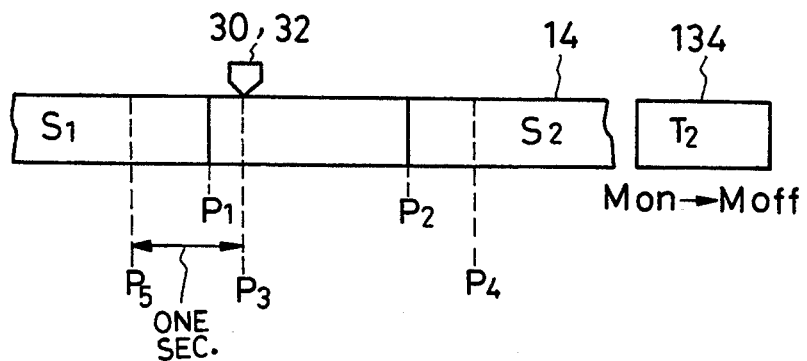
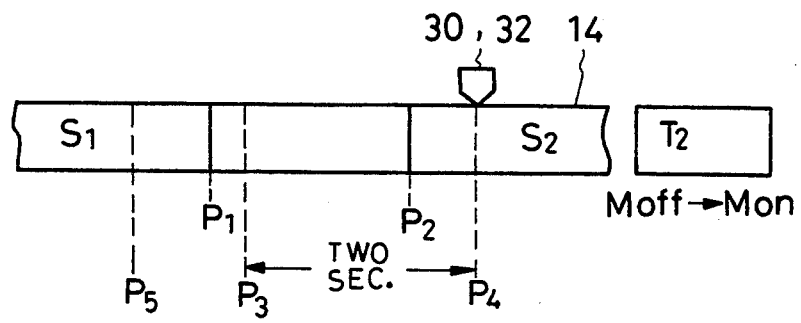
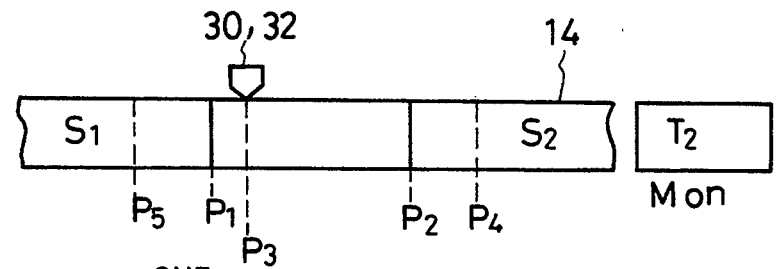
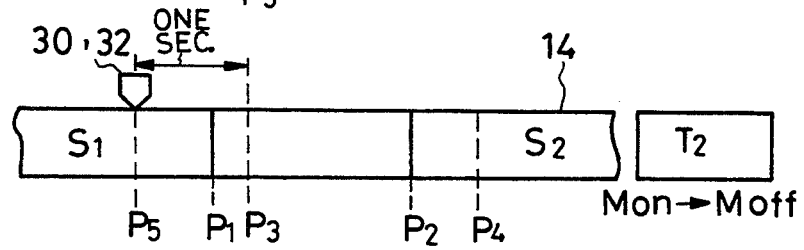
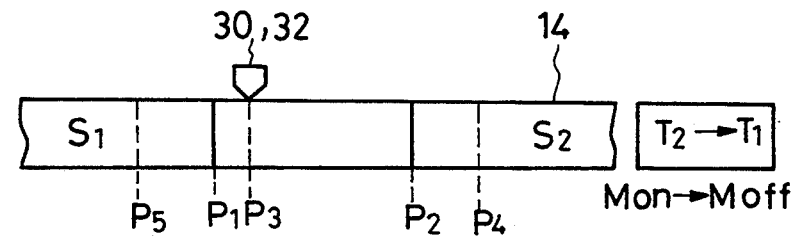

METHOD AND APPARATUS FOR IDENTIFYING SEGMENTS OF INFORMATION RECORDED ON DIGITAL AUDIO TAPE OR THE LIKE

This is a continuation, continuation-in-part, of application Ser. No. 07/640,962, filed Jan. 14, 1991, now abandoned.

BACKGROUND OF THE INVENTION

My invention relates to the art of recording and reproducing digital information on and from record media typically including digital audio. tape packaged in cassette form. More particularly, my invention pertains to how to individually identify a series of tunes or other segments of information recorded on each digital audio tape cassette or the like, in order to make possible the selective reproduction of such information segments. Still more particularly, my invention concerns a method of, and means for, writing start marks in selected positions between prerecorded information segments preparatory to the writing of serial program numbers in such selected positions.

It has been standardized with digital audio tape apparatus to record digitized audio or other user information thereon along with what is known as "subcode", such as program numbers and time code. The program numbers are appended sequentially to successive tunes or other information segments recorded. For example, the program number "1"0 may a be attached to the first recorded tune, the program number "2" to the second, and so forth. Such program numbers are of immense help in later searching through the recorded tunes and quickly finding any desired one for reproduction.

Rarely, however, does the user record tunes on the complete length of virgin tape in a single recording session. He will more usually record one or more tunes on part of the tape and then, later, will record additional tunes on the remaining tape length. In that case the same program numbers "1", "2",. . . will be attached to the tunes recorded on the same tape during the second, as well as any subsequent, recording session. The program numbers are no longer sequential throughout all the recorded tunes. Therefore, unless the tunes are renumbered sequentially, any one of them cannot possibly be located in a standard search mode.

Inazawa et al. U.S. Pat. No. 4,641,208, assigned to Sony Corp. of Tokyo, Japan, represents a conventional solution to the problem of how to serially append program numbers to the tunes recorded in two or more sessions. It teaches the recording of temporary start marks, rather than program numbers, with the tunes recorded during the second and any subsequent session. The start marks are utilized for searching through the recorded tunes in subsequently rerecording program numbers in an orderly sequence in their steads. Japanese Unexamined Patent Publication No. 61-258357, filed by Sony Corp., teaches how to record the start marks exactly in preassigned positions and for a preassigned time, on digital audio tape.

Although these known solutions are satisfactory in their own ways, I still object to them for the following reasons. Program numbers, and therefore start marks, too, must be recorded between the prerecorded tunes. Accordingly, the user has to reproduce at least parts of the prerecorded tunes for finding their beginnings or ends and for determining proper positions for writing start marks between the tunes. The noted prior art approaches have forced the user to rely solely on his auditory sensation for the determination of positions to be stark marked, as well as for the subsequent amendment, if necessary, of the selected positions. It has therefore been a very difficult and time-consuming task for the user to write start marks in appropriate positions between all the tunes recorded on a single length of tape in two or more sessions.

SUMMARY OF THE INVENTION

I have hereby invented how to expedite the determination of proper positions for writing start marks, or other control marks or data including program numbers, between a series of information segments prerecorded on digital audio tape or other record media.

Briefly stated in one aspect thereof, my invention concerns, in a recording and reproducing apparatus of the type having transducer means for writing and reading information on a record medium, a method of writing control data such as start marks or program numbers in selected positions between segments of information that have been written one after another on the record medium, the record medium also having written thereon positional data (e.g. standard time code data) representative of the position of the record medium with respect to the transducer means. According to the method of my invention, the prerecorded information on a the record medium is first audibly reproduced, with the varying current position of the record medium with respect to the transducer means conventionally visibly displayed on display means on the basis of the positional data being read by the transducer means on the record medium. The user is to select a position on the record medium between two sucessive segments of information thereon by actuating position select means when the transducer means relatively comes to such a position on the record medium in the course of the audible reproduction of the information. Upon actuation of the position select means the positional data that is read by the transducer means on the record medium at that moment and which, therefore, represents the selected position on the record medium is written on memory means and is visibly displayed on the display means. The audible reproduction of the information is continued for a preassigned, relatively brief time after the actuation of the position select switch, with the display means maintained to display the selected position on the basis of the positional data that has been written on the memory means. Then the transducer means is relatively returned to the selected position on the record medium for writing a start mark, or any other desired control data, in the selected position.

Thus the operator can know whether he has selected a proper position for writing a start mark as the audible reproduction of the prerecorded information is continued for a brief time following the actuation of the position select means. The display means continues the display of the selected position during such continued reproduction, and preferably until a start mark is written in the selected position. Consequently, the operator need not rely solely on the audible reproduction of the information, as has been the case heretofore, but also on the continued visible display of the selected position, for the determination of a position to be start marked.

The method of my invention also provides for making sure that the selected position on the record medium is good for writing desired control data. To this end the transducer means is temporarily relatively returned to the selected position on the record medium. Then the prerecorded information on the record medium is audibly reproduced for a preassigned time from the selected position. The display means is maintained to display the selected position, on the basis of the positional data that has been written on the memory means, throughout this confirmation process. Thus, here again, the operator can rely not only on the audible reproduction of the information but also on the continued visible display of the selected position.

Additionally, the method of my invention permits similarly easy amendment of the selected position on the record medium. The operator may actuate amendment means (e.g. conventional fast forward switch and reverse or rewind switch) to this end, The actuation of the amendment means does not result in an actual change in the relative positions of the transducer means and the record medium but in the amendment of the positional data that has been written on the memory means. The thus amended positional data on the memory means represents an amended position on the record medium which is displaced from the selected position to a predetermined degree in either of two opposite directions. The display means displays the amended position and continues to display it until the transducer is subsequently relatively returned to the amended position for writing desired control data in that position. The operator can therefore visually confirm how the previously selected position is amended.

Furthermore, the method of my invention permits the operator to make sure, by both auditory and visual sensations, that the amended position on the record medium is good for writing desired control data. For such confirmation, too, the transducer is temporarily relatively returned to the amended position on the record medium, and the prerecorded information is audibly reproduced for a preassigned time from the amended position. The display means continues the display of the amended position during all this confirmation process.

Another aspect of my invention concerns a system for carrying the above summarized method into practice in a recording and reproducing apparatus of the type defined. The system comprises: (a) position select means to be actuated for selecting a position on the record medium between any two successive segments of information thereon when the transducer means relatively comes to such a position on the record medium in the course of audible reproduction of the recorded information; (b) memory means for storing the positional data that is read on the record medium by the transducer means when the position select means is actuated and which, therefore, represents the selected position on the record medium; (d) display means for normally visibly displaying the current position of the record medium with respect to the transducer means on the basis of the positional data being read by the transducer means on the record medium and, upon actuation of the position select means, for visibly displaying the selected position on the record medium on the basis of the positional data stored on the memory means; and (e) programmable controller means connected to all of the drive means and the position select means and the memory means and the display means for causing the audible reproduction of the information to be continued for a preassigned time after the actuation of the position select means, then for causing the drive means to relatively return the transducer to the selected position on the record medium, and then for causing the transducer means to write desired control data in the selected position on the record medium, with the display means maintained to display the selected position on the record medium until the control data is written in the selected position.

The system of my invention can be readily incorporated with a digital audio tape cassette apparatus of standard design. Such a digital audio tape cassette apparatus has a first set of display windows for displaying in hours, minutes and seconds the current position of the tape with respect to the transducer means (e.g. rotary head assembly) on the basis of the time code data being read on the tape by the transducer means, and a second set of display windows for displaying a program number, if any, of each segment of information being read on the tape by the transducer means.

The display means included in the system of my invention can be a combination of the two sets of display windows. Upon actuation of the position select means, which may be a simple pushbutton switch, the first set of display windows display in hours, minutes and seconds the selected position on the tape on the basis of the time code data that has been read at that time on the tape and transferred to the memory means. The second set of display windows, on the other hand, display the selected position in frames per second. The operator can thus know the position he selected to the accuracy of frames.

For amending the selected tape position as required, I suggest that either the familiar fast forward switch or the reverse or rewind switch be depressed depending upon the direction in which the selected position is to be shifted. A prescribed number (e.g. five) of frames is added to, or subtracted from, the time code data on the memory means each time the fast forward switch or the reverse switch is depressed. The thus amended time code data is displayed by the first and second sets of display windows and is held so until, with the transducer means relatively returned to the amended position on the tape, a start mark or other desired control data is written in that position.

The above and other features and advantages of my invention will become more apparent, and the invention itself will best be understood, from a study of the following detailed description and appended claims taken together with the attached drawings showing a preferred mode of carrying out my invention.

BRIEF DESCRIPTION OF THE DRAWINGS

FIG. 3 is a block diagram showing the read/write circuit of the FIG. 1 apparatus in greater detail;

FIGS. 4A–4D constitute in combination a flowchart of the start marking routine programmed into the system controller of the FIG. 1 apparatus;

FIGS. 5A–5J are a series of diagrams showing the relative positions of the transducer means and the tape, the diagrams being explanatory of how a position on the tape is selected between two tunes prerecorded thereon and how a start mark is subsequently written in the selected position.

DETAILED DESCRIPTION

Figure 1:
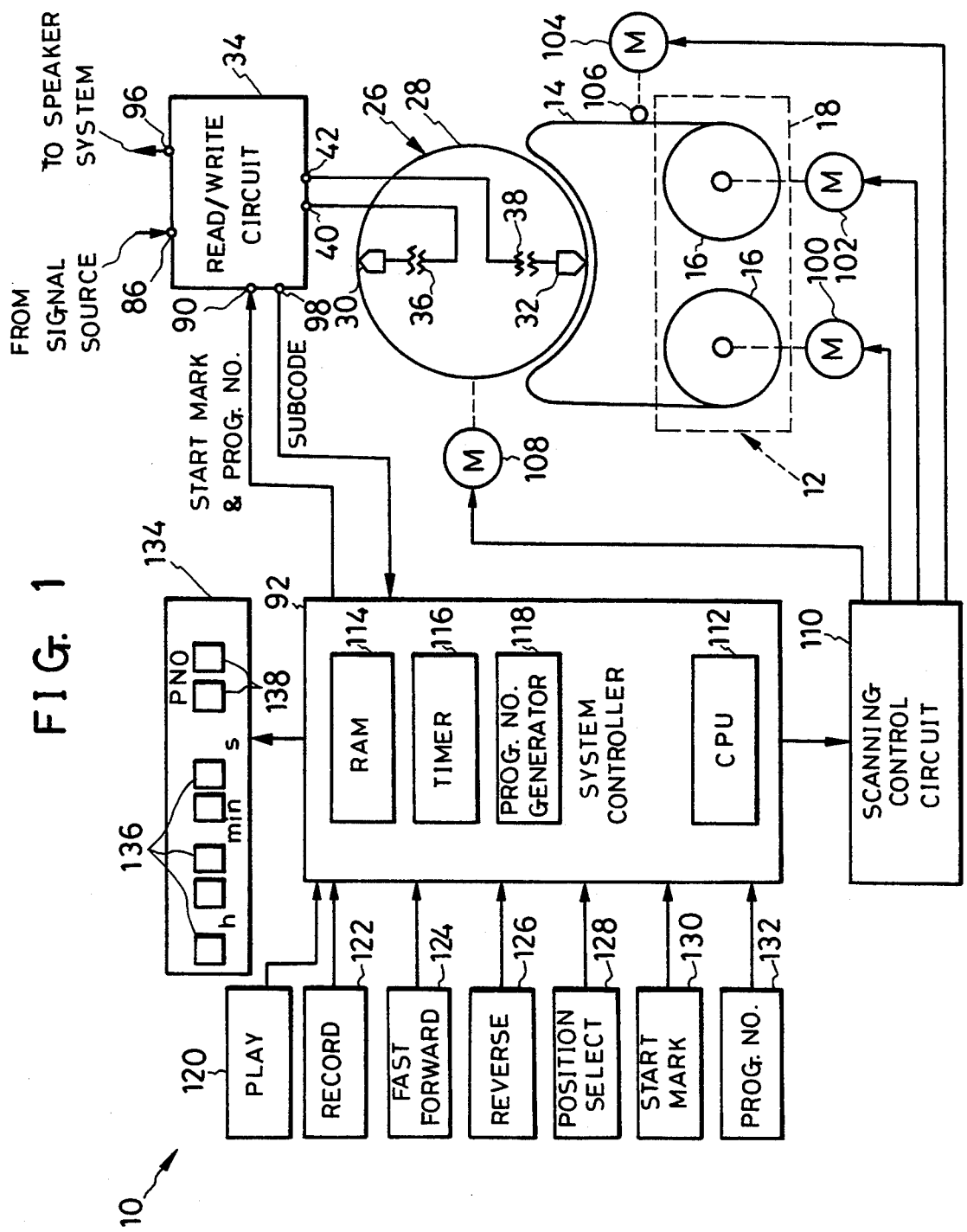
FIG. 1 is a block diagram of a digital audio tape cassette apparatus embodying the principles of my invention.

I will now describe my invention in detail as adapted for the rotary head, digital audio tape cassette apparatus illustrated schematically in FIG. 1 and therein generally designated 10. The apparatus 10 is for use with a replaceable digital audio tape cassette 12 of standard construction having a length of magnetic tape 14 movable between a pair of reels 16 within a housing 18.

Figure 2:
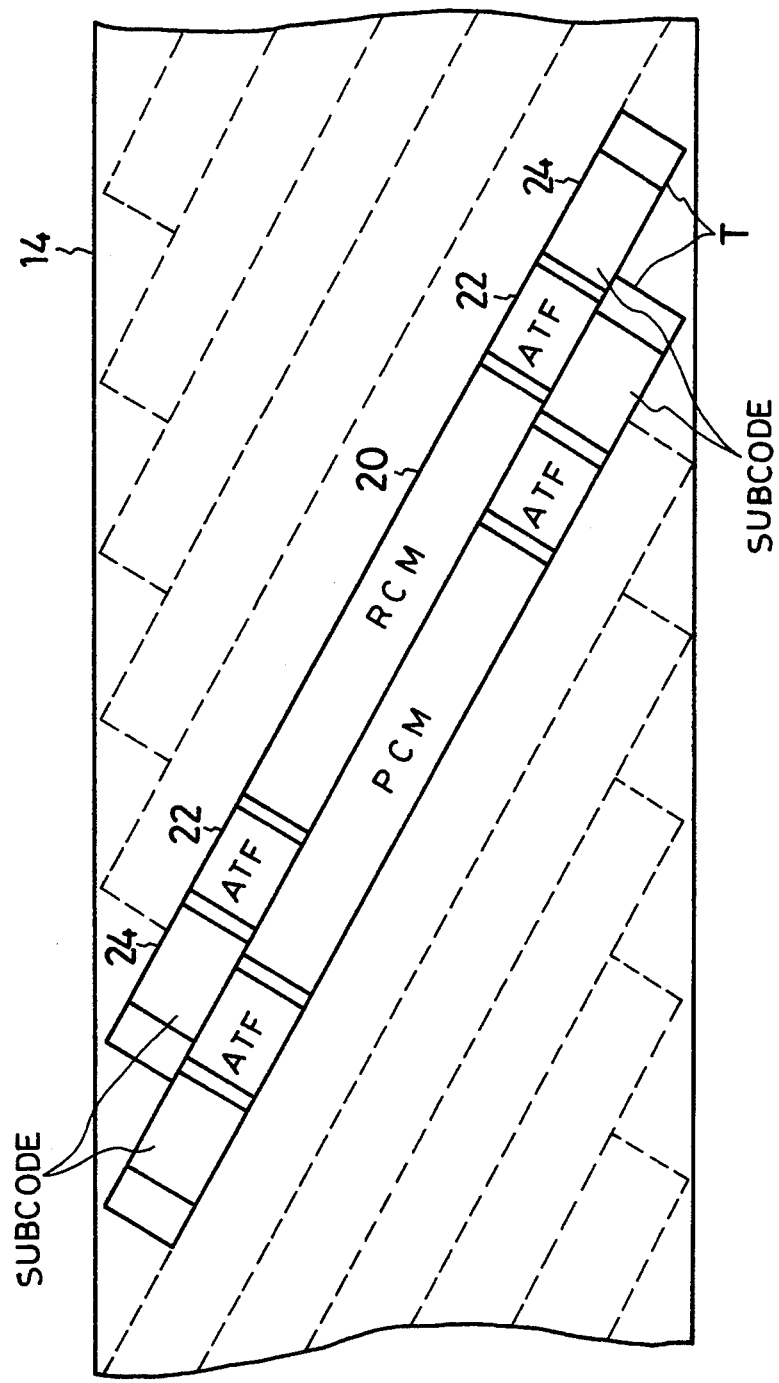
FIG. 2 is a schematic illustration of the standard track format of the digital audio tape for use with the apparatus of FIG. 1.

FIG. 2 is an illustration of the standard arrangement of a series of slanting record tracks T on the tape 14 of the cassette 12. Each record track T is divided into a central PCM zone 20, a pair of ATF zones 22 on both sides of the PCM zone, and a pair of subcode zones 24 on the outer sides of the ATF zones. The PCM zone 20 is for recording user information such as music. The ATF zones 22 are for recording tracking control data. The subcode zones 24 are for recording supplementary control data including time code data, program numbers, and start marks. The time code can, for example, be of the IRIG standards representative of the running time of the tape from the beginning to the end in hours, minutes, and seconds, and of the number of frames per second.

With reference back to FIG. 1 the tape cassette apparatus 10 includes a rotary head assembly 26 around which the tape 14 is to be wrapped through an angle of approximately 90 degrees on being loaded in the apparatus. The rotary head assembly 26 includes a rotary drum 28 having a pair of data transducers or read/write heads 30 and 32 mounted in diametrically opposite positions thereon for data transfer contact with the tape 14. The read/write heads 30 and 32 are electrically connected to a common read/write circuit 34 via rotary transformers 36 and 38, respectively.

FIG. 3 is a detailed diagram of the read/write circuit 34. The pair of rotary transformers 36 and 38 are connected to a pair of input/output terminals 40 and 42 which in turn are connected to first 44 and second 45 read/write select switches, respectively. The read/write select switches 44 and 46 are connected to first 48 and second 50 head select switches via two write amplifiers 51 and 52 and two read amplifiers 54 and 56.

More specifically, the first read/write select switch 44 has a movable contact 58 connected to the input/output terminal 40, a first fixed contact 60 connected to the first head select switch 48 via the write amplifier 51, and a second fixed contact 62 connected to the second head select switch 50 via the read amplifier 54. The second read/write select switch 46 has a movable contact 64 connected to the other input/output terminal 42, a first fixed contact 66 connected to the first head select switch 48 via the write amplifier 517, and a second fixed contact 68 connected to the second head select switch 50 via the read amplifier 56.

The first head select switch 48 has first 70 and second 72 fixed contacts connected to the write amplifiers 51 and 52, respectively, and a movable contact 74 capable of selective engagement with the fixed contacts 70 and 72. The second head select switch 50 has first 76 and second 78 fixed contacts connected to the read amplifiers 54 and 56, respectively, and a movable contact 80 capable of selective engagement with the fixed contacts 76 and 78.

Connected to the movable contacts 74 and 80 of the head select switches 48 and 50 are a write circuit 82 and a read circuit 84, respectively. The write circuit 82 has an input connected to a user data input 86 via an analog to digital converter (ADC) 88, and another input connected to a subcode input 90 which in turn is connected to a system controller 92, FIG. 1, included in tile apparatus 10. Thus the write circuit 82 inputs both digitized user information from the ADC 88 and subcode data from the system controller 92 and puts them out in multiplex form required for recording on the tape 14 in the format of FIG. 2. Such multiplex output from the write circuit 82 is fed to the pair of read/write heads 30 and 32, FIG. 1, via the first head select switch 48, the write amplifiers 51 and 52, and tile read/write select switches 44 and 46.

The read circuit 84 inputs the data retrieved by the heads 30 and 32 from the tape 14 via tile read/write select switches 44 and 46, the read amplifiers 54 and 56, and the second head select switch 50. It is among the functions of the read circuit 84 to demultiplex the input data into the user information and the subcode data. The user information is directed via a digital to analog converter (DAC) 94 to an output 96 which is connected to a loudspeaker system, not shown, via suitable amplifier means, also not shown. The analog equivalent (audio frequency signal) of the recovered user information from the DAC 94 is to be audibly reproduced by the unshown speaker system. The digital subcode data is directed to another output 98 which is connected to the system controller 92, FIG. 1.

Preferably, the read/write select switches 44 and 46 and the head select switches 48 and 50 are all electronic switches, having no such mechanical contacts as shown in FIG. 3. I have shown the switch contacts purely for the ease of understanding.

As will be understood by referring to FIG. 1 again, the tape cassette apparatus 10 further comprises a pair of reel motors 100 and 102 capable of driving engagement with the respective tape reels 16 of the tape cassette 18, a capstan motor 104 drivingly coupled to a capstan 106 for the constant speed travel of the tape 14, and a drum motor 108 drivingly coupled to the drum 28 of the rotary head assembly 26. All these motors 100, 102, 104 and 108 are under the control of a scanning control circuit 110 which enables the pair of read/write heads 30 and 32 to relatively scan the tape 14 as dictated by the system controller 92.

The system controller 92 can take the form of a microcomputer comprising a central processor unit (CPU) 112, a random access memory (RAM) 114, and a read only memory (ROM), not shown, which is preprogrammed for the execution of commands by the CPU. Furthermore the system controller 92 is internally provided with timer means 116 and program number generator means 118.

The following switches are connected to the system controller 92: the PLAY switch 120, RECORD switch 122, FAST FORWARD switch 124, REVERSE switch 126, POSITION SELECT switch 128, START MARK switch 130, and PROG. NO. switch 132, which may all be pushbutton switches. The PLAY switch 120, RECORD switch 122, FAST FORWARD switch 124 and REVERSE switch 126 are per se well known in the art. The POSITION SELECT switch 128, START MARK switch 130 and PROG. NO. switch 132 are all to be actuated in individually identifying the tunes or other segments of information on the tape 14 according to my invention. The functions of these switches will become apparent in the course of the subsequent description of operation. The system controller 92 controls the read/write circuit 34, the scanning control circuit 110 and the display means 134 in response to the actuation of these switches 120-132 by the user.

Also connected to the system controller 92 are display means 134 having two sets of windows 136 and 138. The display windows 136 are for digitally displaying the running time of the tape 14 in hours, minutes and seconds on the basis of the time code data recorded on the subcode zones 24, FIG. 2, of the tape. The other display windows 138 have so far been devoted solely to the exhibition of program numbers.

However, according to my invention, the display windows 138 are also utilized for the display of current tape position in frames per second during the process of finding positions for writing start marks. The time code data on the subcode zones 24 of the tape 14 includes that representative of tape position in frames per second. One frame is 30 milliseconds. The user can thus know current tape position to the accuracy of frames. No confusion is to arise as to whether the display windows 138 are showing a program number or tape position in frames because the indicia PNO over these windows are to be self-illuminated only when a program number is being indicated.

Operation

I will now discuss how the individual tunes or equivalent segments of information recorded on the tape 14 of the cassette 12 are individually identified in accordance with my invention. The process of such information identification involves two primary steps: {a) the writing of start marks between the recorded tunes, which forms the gist of my invention, and {b) the subsequent writing of program numbers in an orderly sequence in the positions indicated by the start marks. The operator can write start marks in selected positions on the tape 14 with the aid of a start marking program introduced into the system controller 92 according to the novel concepts of my invention. I have flowcharted the start marking program in FIGS. 4A-4D, in which the indicia $L_1$-$L_4$ indicate the continuities of the lines between the blocks.

I will refer also to FIGS. 5A-5J and 6A-6K for such discussion of the start marking operation. These figures are explanatory of the various positions of the pair of heads 30 and 32 with respect to the tape 14 of the digital audio tape cassette 12, of the corresponding indications $T_1$, $T_2$ and $T_{2a}$, on the display means 134, and of whether the read/write circuit 34 is muted against sound reproduction or not (Mon, Moff). It is understood that the tape 14 has already recorded thereon first $S_1$ and second $S_2$ tunes with an intervening space $P_1$-$P_2$ therebetween.

Figure 5A:
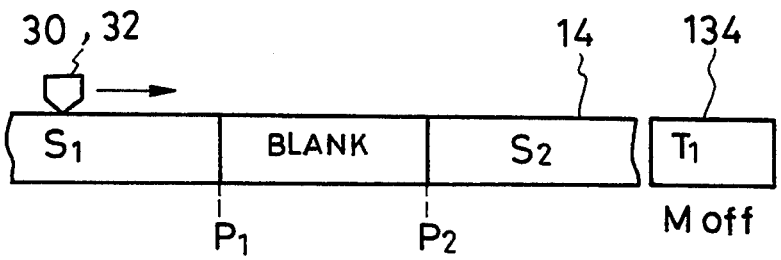

Thus, in FIG. 5A for instance, the heads 30 and 32 are reading the first tune $S_1$ on the tape 14. The indicia $T_1$ indicates that the display means 134 are displaying on the windows 136 the running time (current position) of the tape 14 in hours, minutes and seconds on the basis of the time code data being read on the tape, and on the windows 138 the program number of the tune being reproduced if such a program number has already been attached to that tune. Then, preferably, the letters PNO over the windows 138 may be illuminated to indicate that the windows 138 are displaying a program number.

Figure 5B:
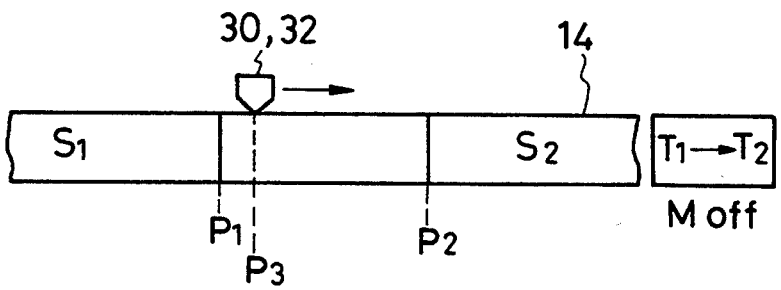

The indicia $T_2$ in FIG. 5B, for instance, indicates that the time code data that has been transferred from the tape 14 to the RAM 114 of the system controller 92 is being displayed on the windows 136 to show a selected tape position in hours, minutes and seconds. The indicia $T_{2a}$ in FIG. 6D, for instance, indicates that the time code data on the RAM 114 is being displayed in amended form, to be explained later, on the windows 136. Also, when the RAM time code data is being displayed, as represented by both $T_2$ and $T_{2a}$, the display windows 138 exhibit the tape position in frames per second, and the letters PNO are unlit. Mon indicates that the reproduction system is muted, and Moff that it is not.

I suggest that, in renumbering all the tunes recorded on the tape 14 in two or more sessions, start marks be first written on the subcode zones 24, FIG. 2, of the tape in selected positions between the tunes in order to mark the positions where program numbers are to be written subsequently. Serial program numbers may then be written in the start marked positions before all the prerecorded tunes. Each start mark may be a binary "1".

For recording the start marks the operator is to actuate the PLAY switch 120, FIG. 1, for setting the apparatus 10 in the playback mode. The operator may listen to the first tune $S_1$ as this tune is audibly reproduced by either the unshown loudspeaker system or headphone. As shown in FIG. 5A, the display means 134 will digitally display on the windows 136 the running time of the tape 14 from the time code data read from the subcode zones 24 of the slanting tape tracks T, and on the windows 138 the program number, if any, of the tune being reproduced, with the letters PNO illuminated.

FIG. 5B shows the reproduction of the first tune $S_1$ subsequently completed, with the heads 30 and 32 in a position $P_3$ right after the position $P_1$, where the first tune ends, and before the position $P_2$ where the second tune $S_2$ begins. Now the operator may actuate the POSITION SELECT switch 128 if he wants a start mark, and therefore later a program number, to be written in this position $P_3$. The system controller 92 will be initiated into the start marking routine of FIGS. 4A-4D upon actuation of the POSITION SELECT switch 128, as set forth in detail hereafter.

Figure 4A:
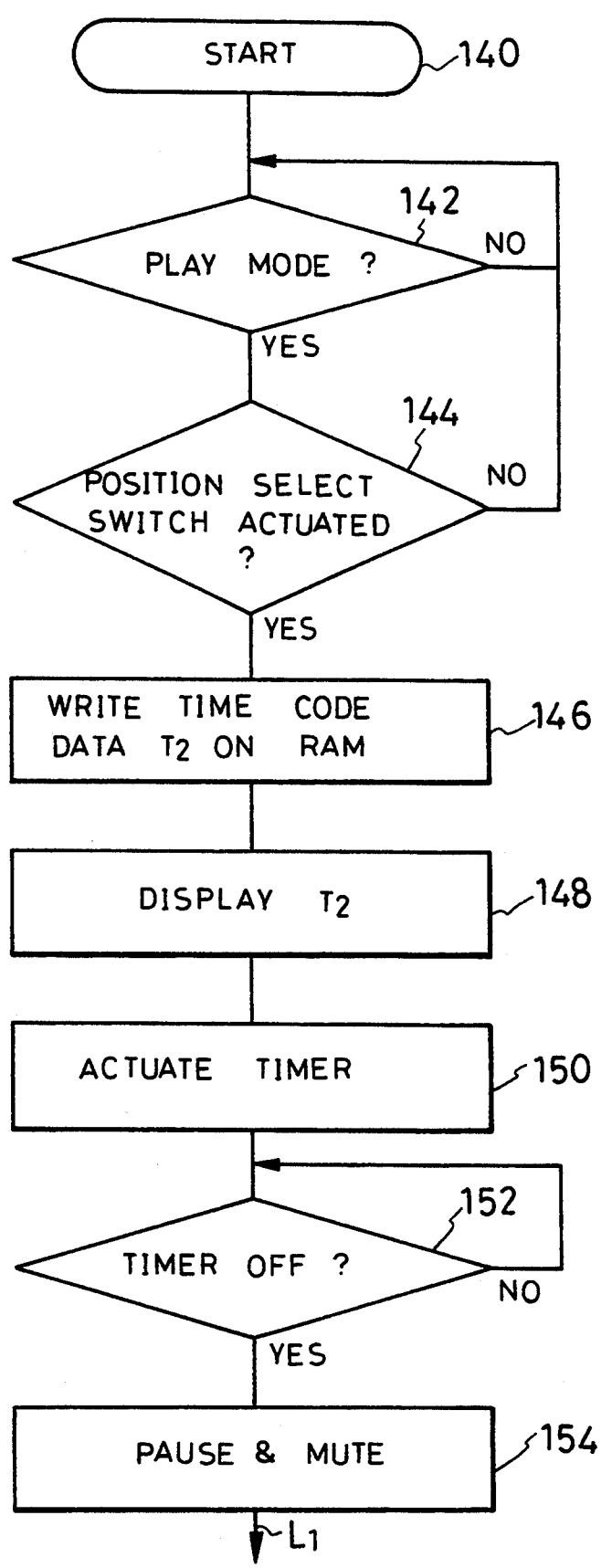

The start marking routine starts at a block 140 in FIG. 4A. It is subsequently determined at 142 whether the apparatus is in the playback mode, and at 144 whether the POSITION SELECT switch 128 has been actuated. Then, at the next block 146, the time code data that has been read on the tape 14 at the moment of actuation of the POSITION SELECT switch 128 is written on the RAM 114 of the system controller 92. The time code data thus transferred from tape 14 to RAM 114 represents, in hours, minutes and seconds, as well as in frames, the selected tape position $P_3$ where a start mark is to be written and is designated $T_2$ in FIGS. 5A-5F and 6A-6F.

Simultaneously, the indications on the display means 134 are changed from $T_1$ to $T_2$, as indicated at a block 148 in FIG. 4A and as shown in FIG. 5B. Thus the selected tape position $P_3$ will be digitally exhibited on the display windows 136 in hours, minutes and seconds, and on the other display windows 138 in frames, on the basis of the time code data that has been transferred as above from tape 14 to RAM 114. Simultaneously, the illumination of the letters PNO over the display windows 138 will go off, thereby enabling the operator to know that these windows are not showing a program number.

Figure 5C:
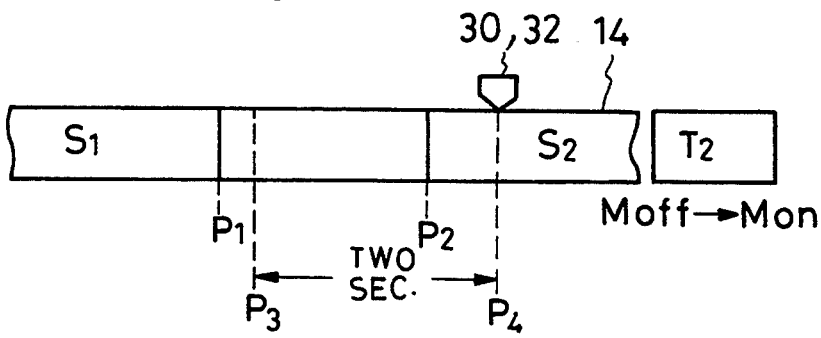

Tape playback is to be continued notwithstanding the above actuation of the POSITION SELECT switch 128, as the timer 116, FIG. 1, of the system controller 92 is triggered upon actuation of the POSITION SELECT switch 128 according to the next step 150 of the start marking routine. I understand that the timer 116 is preset at a preasssigned time of, say, two seconds. Then, upon lapse of two seconds at a logical node 152, the tape playback is paused and muted as at a block 154. This step is illustrated in FIG. 5C. The head 30 or 32 is positioned at P4, having audibly reproduced just a starting part of the next recorded tune $B_2$.

The operator may now decide whether or not the selected tape position $P_3$ is a proper position for writing a start mark. The reader's attention is invited to the fact that the display means 134 has been displaying the selected tape position $P_3$, instead of the varying current tape position, during the above continued tape playback from position Pa to position $P_4$. Such continued or fixed display of the selected position $P_3$ is possible because, unlike the prior art, the time code data representative of that tape position has been written on the RAM 114 of the system controller 92 upon actuation of the POSITION SELECT switch 128. Accordingly, the operator can rely for his decision on both the audible reproduction of the recordings and the visible, fixed display of the selected tape position $P_3$.

If the operator decides that the selected position $P_3$ is good for start marking, he may actuate the START MARK switch 130. In that case the start marking routine will proceed from a logical node 156, FIG. 4B, to the steps 158, 160, 162, 164, 166, 168, 170 and 172, FIG. 4D, along the line $L_4$ for writing a start mark in the position $P_3$.

Alternatively, if the operator wants to make sure that $P_3$ is a proper position for start marking, he may actuate the PLAY switch 120 after the block 154, FIG. 4A. Thereupon the system controller 92 will be triggered into a position check subroutine, illustrated in FIG. 4C, of the start marking routine. The following is the description of this position check subroutine.

Figure 4C:
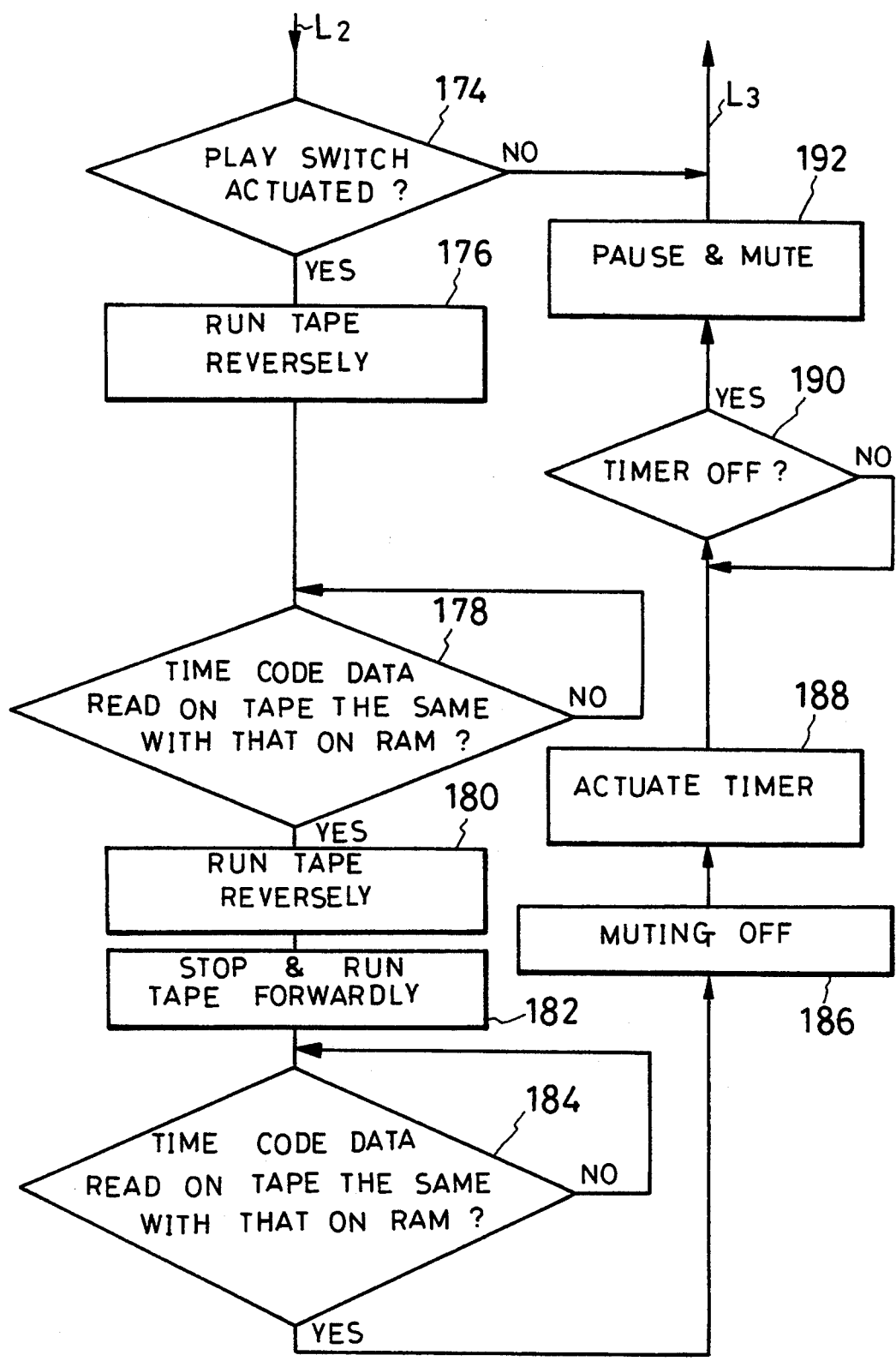

Knowing at a logical node 174 that the PLAY switch 120 has been actuated, the system controller 92 will cause the tape 14 to be run reversely, as at a block 176, FIG. 4C. As is conventional with digital audio tape apparatus of this kind, the heads 30 and 32 constantly read the current time code data $T_1$ on the tape 14 traveling past them. The system controller 92 constantly refers the current time code data $T_1$ to the time code data $T_2$ that has been stored on the RAM 114, which stored data now represents the selected tape position $P_3$. This operation of the system controller 92 is indicated at a block 178, FIG. 4C.

Figure 5D:
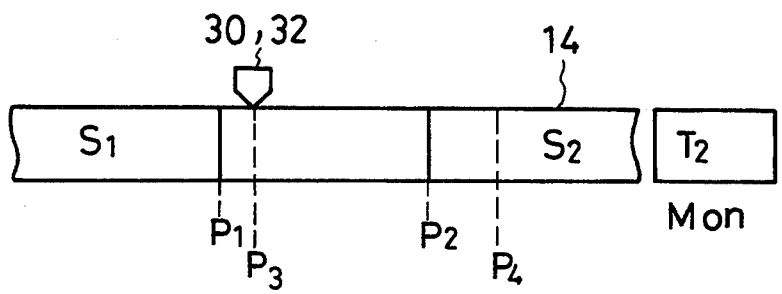
Figure 5E:
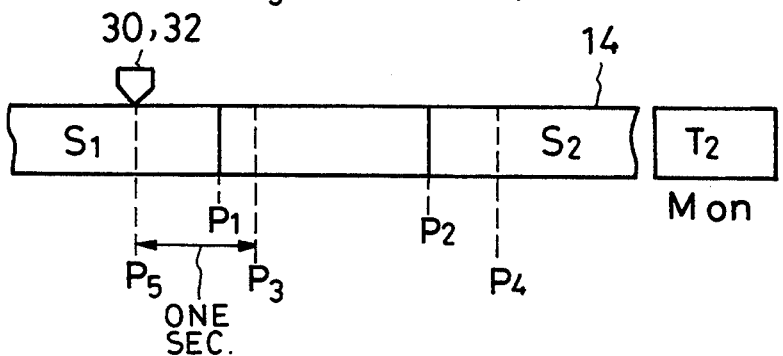

When the current time code data $T_1$ is found to agree with the stored time code data $T_2$, that is, when the head 30 or 32 relatively returns to the selected position $P_3$ as in FIG. 5D, the tape is further made to run reversely for another preassigned time of, say, one second, as represented by a block 180, FIG. 4C. FIG. 5E shows the head 30 or 32 thus positioned at $P_5$, which is one second upstream of $P_3$. Then the tape 14 comes to a stop and is subsequently run forwardly, as at a block 182, FIG. 4C.

During this forward travel of the tape 14 from the position $P_5$, too, the system controller 92 constantly refers the current time code data $T_1$ to the time code data $T_2$ stored on the RAM 114, as at 184, FIG. 4C, When the head 30 or 32 relatively returns to the selected position $P_3$ as shown in FIG. 5F, the system controller 92 discontinues the muting of the read/write circuit 34, as at a block 186, FIG. 4C, and further proceeds to trigger the timer 116 as at a block 188. The timer 116 will go off when the head 30 or 32 subsequently returns to the position $P_4$ upon lapse of two seconds, as shown in FIG. 5G. Upon detection of this fact at a logical node 190, FIG. 4C, the system controller 92 will set up a pause and a a muting as at a block 192, which marks the end of the position check subroutine.

The read/write circuit 34 has not been muted during the relative travel of the heads 30 and 32 from the selected position $P_3$ of FIG. 5F to the position $P_4$ of FIG. 5G. Therefore, as the recording on the tape 114 is audibly reproduced during this time, the operator can determine whether the position $P_3$ he has selected is appropriate for writing a start mark and, later, a program number.

Having thus made sure that the selected position $P_3$ is good for start marking, the operator may proceed to actuate the START MARK switch 130 immediately before the node 156, FIG. 4B. Then the system controller 92 will respond by causing the tape 114 to run reversely, as at the block 158, FIG.4D. The head 30 or 32 will relatively return to the selected position $P_3$, as shown in FIG. 5H, just when the current time code data $T_1$ being read on the reversely traveling tape 14 is found equal to the time code data $T_2$ that has been stored on the RAM 114, at the node 160. Then the system controller 92 will continue the reverse travel of the tape 14 for the second preassigned time of one second thereafter, as at the block 162. Thus the head 30 or 32 will return to the position $P_5$ as shown in FIG. 5I.

Figure 4D:
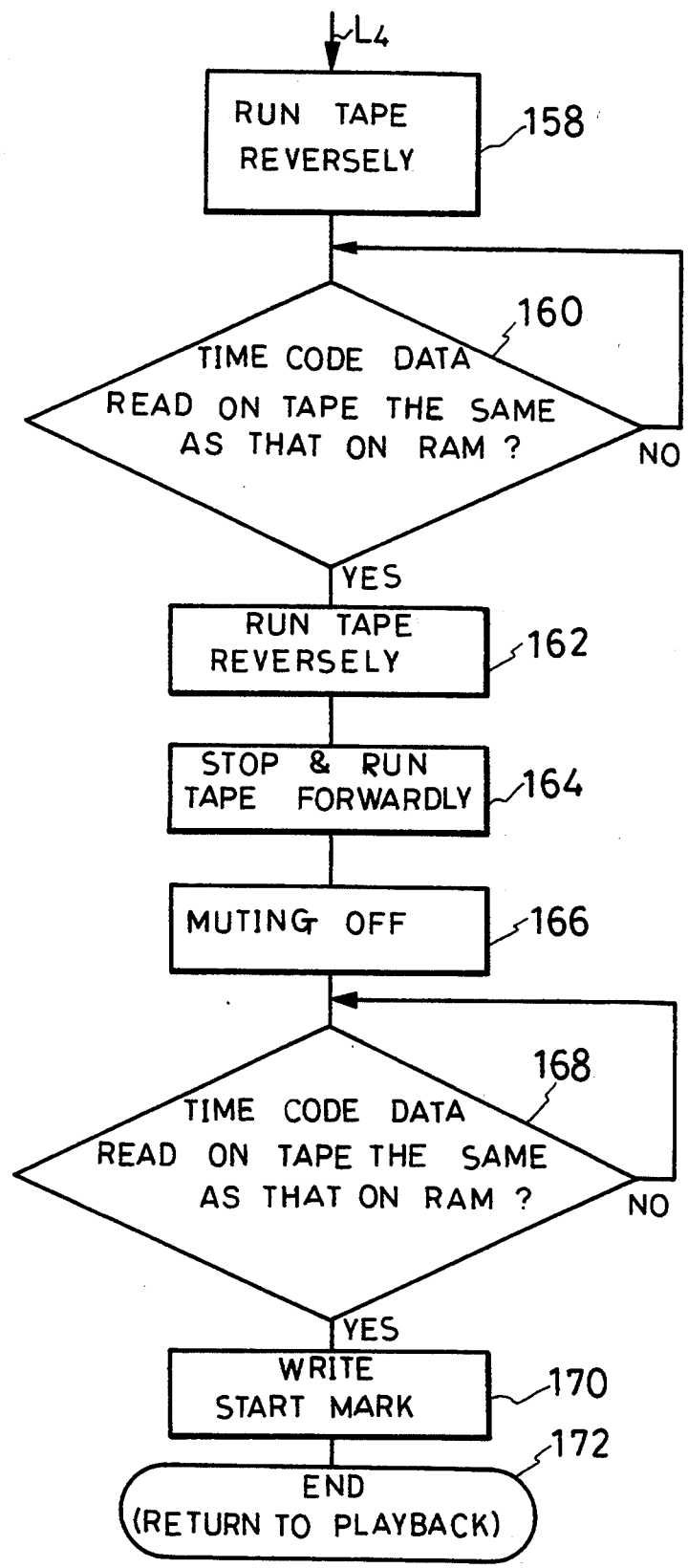

The system controller 92 will discontinue the reverse tape travel when the head 30 or 32 comes to the position $P_5$, as above, and start forward tape playback as at the block 164, FIG. 4D. Also, as indicated at the next block 166, the system controller 92 will discontinue muting. The head 30 or 32 will be in the selected position $P_3$ on the tape 14, as shown in FIG. 5J, when, at the node 168, the time code data $T_1$ being read on the forwardly traveling tape is found to agree with the time code data $T_2$ that has been stored on the RAM 114.

Then a start mark will be written in the position P8 on the tape 14 according to the block 170. Start marks are subsequently utilized for finding tape positions where program numbers are to be written serially. It is therefore desirable that each start mark be written on the subcode zones 24, FIG. 2, of a plurality of tape tracks T.

One start marking routine comes to an end at 172. Then the apparatus 10 returns to tile normal playback mode. The operator may proceeds to find a position for start marking between the next two recorded tunes on the tape 14.

I have so far discussed the start marking routine on the assumption that the position $P_3$ chosen by the actuation of the POSITION SELECT switch 128 was good for start marking. Possibly, however, the operator may find that he has not actuated the POSITION SELECT switch at a proper moment, either immediately after the block 154,FIG. 4A, or as a result of the subsequent optional position check subroutine of FIG. 4C. The amendment of the selected position Pa is then necessary.

To this end the operator may actuate either the FAST FORWARD switch 124 or the REVERSE switch 126, depending upon the direction in which the selected position $P_3$ is to be shifted, just before a logical node 194, FIG. 4B, which follows the node 156. The system controller 92 will be introduced into the forward amendment subroutine upon actuation of the FAST FORWARD switch 124, and into the reverse amendment subroutine upon actuation of the REVERSE switch 126. The forward amendment subroutine comprises blocks 196 and 198, FIG. 4B, and the reverse amendment subroutine comprises blocks 202 and 204.

Let us first assume that the operator has actuated the FAST FORWARD switch 124 for forwardly shifting the selected position $P_3$. As will be recalled by referring to FIG. 4A again, a pause has been set up at the block 154 upon lapse of two seconds following the actuation of the POSITION SELECT switch 128. Since the answer to the logical node 194, FIG. 4B, is now yes, the start marking routine proceeds to the forward amendment subroutine of the blocks 196 and 198.

According to the first block 196 of this subroutine, a predetermined number of frames chosen from the range of one to ten, preferably five, is added to the time code data $T_2$ that has been stored on the RAM 114. Then, as indicated by the next block 198, the time code data on the RAM 114 is rewritten from $T_2$ into $T_{2a}$ ($=T_2+$five frames). The thus amended time code data on the RAM 114 will be exhibited on the display means 134. More specifically, the indications on the display windows 138 will be five frames more than they were before actuation of the FAST FORWARD switch 124. Possibly, the addition of five frames may result in a carryover to the unit of seconds, so that the digits in seconds on the display windows 136 may also change.

Figure 6A:
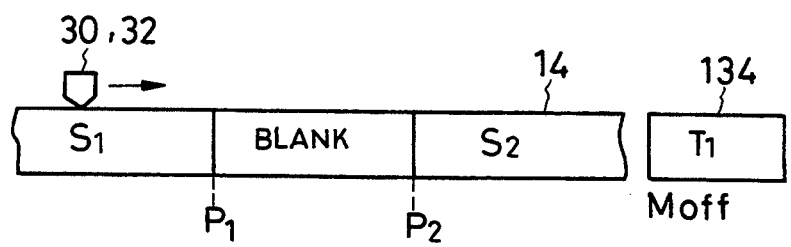
FIGS. 6A-6K are another series of diagrams similar to FIGS. 5A-5J but explanatory of how a tape position between two prerecorded tunes is selected, then amended, and how a start mark is subsequently written in the amended position.
Figure 6B:
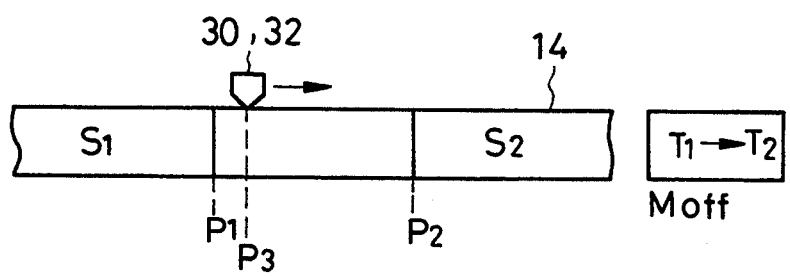
Figure 6C:
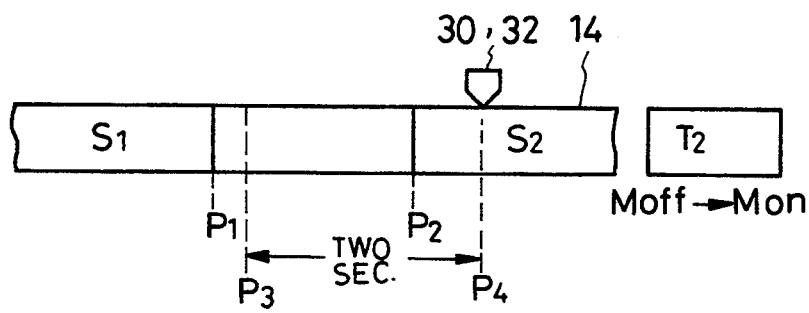
Figure 6D:
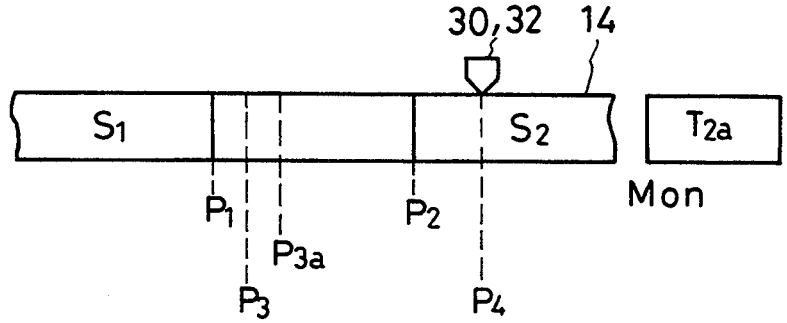

FIGS. 6A-6F are sequential illustrations of the positions of the heads 30 and 32 relative to the tape 14 in the case where a start mark is written on the tape 14 after forwardly amending the selected position from $P_3$ to $P_{3a}$. FIGS. 6A-6C are similar to FIGS. 5A-5C, being illustrative of the steps 140-154, FIG. 4A, of the start marking routine. FIG. 6D represents the block 198, FIG. 4B, of the forward amendment subroutine. It will be noticed that the display means 134 are displaying the amended time code data $T_{2a}$. The amended position corresponding to this amended time code data $T_{2a}$, is indicated at $P_{3a}$; that is, $P_{3a}=P_3+$five frames.

It will also be noted from FIGS. 6C and 6D that the heads 30 and 32 are shown in the same position $P_4$ in these figures. This is because both tape 14 and heads 30 and 32 are not driven when the FAST FORWARD switch 124 is actuated for forwardly amending the selected position $P_3$; only the time code data stored on the RAM 114 is rewritten from $T_2$ to $T_{2a}$, as above.

The REVERSE switch 126 may be actuated for shifting the selected position $P_3$ five frames to the left in FIG. 6C, instead of to the right as in FIG. 6D. Then, since the answer to a node 200, FIG. 4B, which follows the node 194 is yes, the system controller 92 is introduced into the reverse amendment subroutine 202 and 204, which is an alternative to the above explained forward amendment subroutine 196 and 198. The block 202 of this alternative subroutine dictates the subtraction of five frames from the time code data $T_2$ stored on the RAM 114. Then, at the next block 204, the amended time code data is overwritten on the existing time code data $T_2$ on the RAM 114. In the case of this reverse amendment subroutine, too, both tape 14 and heads 30 and 32 are not driven in response to the actuation of the REVERSE switch 126; only the time code data $T_2$ that has been stored on the RAM 114 is amended.

Of course, the need may arise for shifting the selected position $P_3$ more than five frames in either direction. In that case either the FAST FORWARD switch 124 or the REVERSE switch 126 may be actuated twice, thrice, and an even greater number of times, for shifting the selected position $P_3$ ten frames, fifteen frames, and so on, in the required direction.

After amending the selected position $P_3$ as required in either of the above specified ways, the operator may actuate the START MARK switch 130 for writing a start mark in the amended position $P_{3a}$. Then the start marking routine will proceed from the node 156, FIG. 4B, to the block 158, FIG. 4D, along the line $L_4$, as has been described previously, and a start mark will be written in the amended position.

The start marking routine of FIGS. 4A14 4D is well designed so that the user may make sure that the amended position $P_{3a}$, is appropriate for writing a start mark, just as he did to check the appropriateness of the initially selected position $P_3$. For such confirmation, the operator may actuate the PLAY switch 120 before actuating the START MARK switch 130, as in the above described case of FIGS. 5A-5J where the selected position $P_3$ has not been amended. Then the position check subroutine of FIG. 4C will be initiated. The positions of the heads 30 and 32 relative to the tape 14 will then change as depicted in FIGS. 6E-6H. Incidentally, these steps of FIGS. 6E-6H would be omitted if the operator actuated the START MARK switch 130 instead of the PLAY switch 120, thereby skipping the position check subroutine.

Figure 6E:
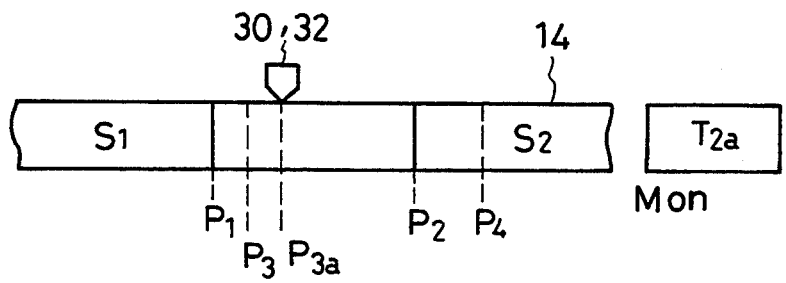
Figure 6F:
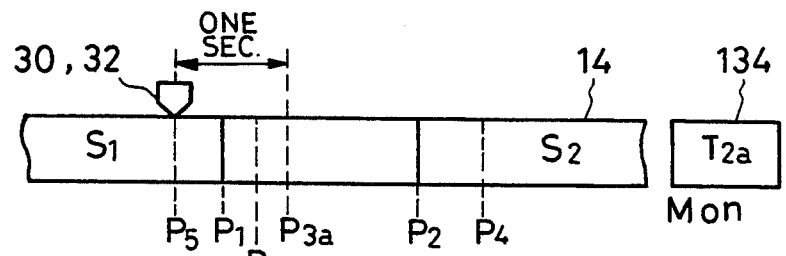

I will now explain more specifically how the position check subroutine of FIG. 4C enables the operator to determine that the amended position $P_{3a}$ is appropriate for a start mark. Upon actuation of the PLAY switch 120 at the node 174 the tape 14 will start traveling reversely according to the block 176, FIG. 4C, until the head 30 or 32 relatively comes to the amended position $P_{3a}$ as shown in FIG. 6E. The fact that the head 30 or 32 has come to the amended position $P_{3a}$ is ascertained as aforesaid by the fact that the current time code data $T_1$ being read on the tape 14 has agreed with the amended time code data $T_{2a}$ stored on the RAM 114, as indicated at the node 178 of the position check subroutine.

Then, as dictated by the block 180, the tape 14 will travel reversely for another one second. The head 30 or 32 will then come to the position $P_5$ of FIG. 6F.

Figure 6G:
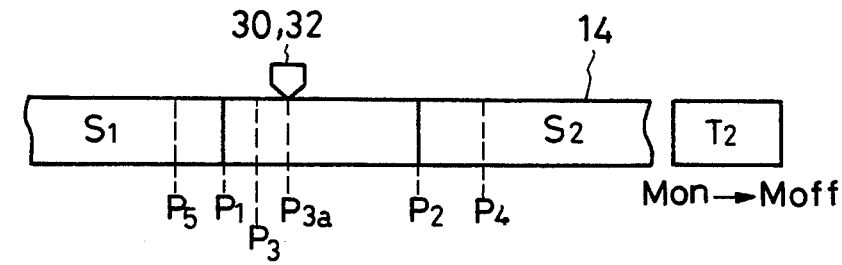
Figure 6H:
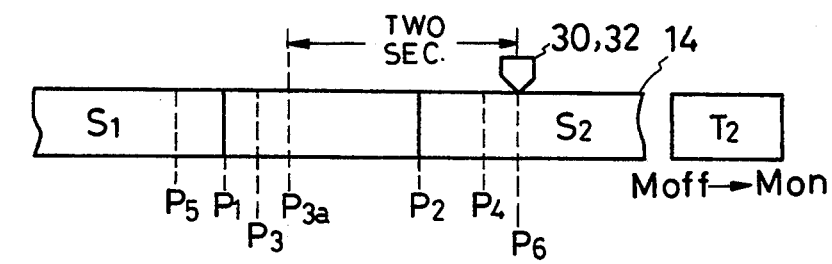

Then the tape 14 will travel forwardly in the playback mode according to the block 182. Subsequently ascertaining at the node 184 that the head 30 or 32 has relatively come to the amended position $P_{3a}$, as shown in FIG. 6G, the system controller 92 will discontinue muting at the block 186. Simultaneously, the timer 116 will be triggered at the block 188. Then the tape 14 will be paused after traveling forwardly for additional two seconds, according to the node 190 and block 192. The heads 30 and 36 will relatively travel from position $P_{3a}$ to position $P_6$ on the tape 14 with the two seconds forward travel of the tape, as indicated in FIG. 6H. The position check subroutine has now been completed.

Figure 6I:
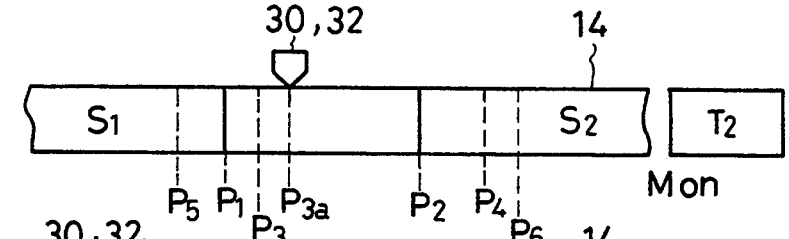
Figure 6J:
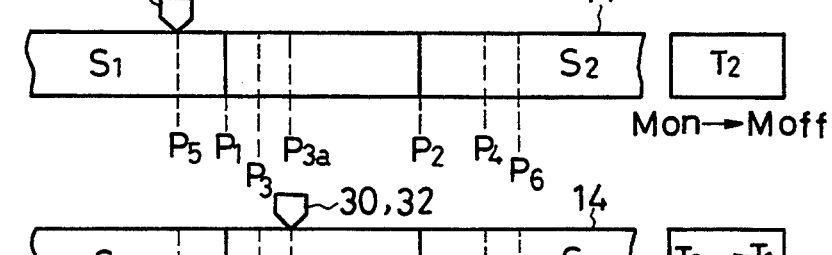
Figure 6K:
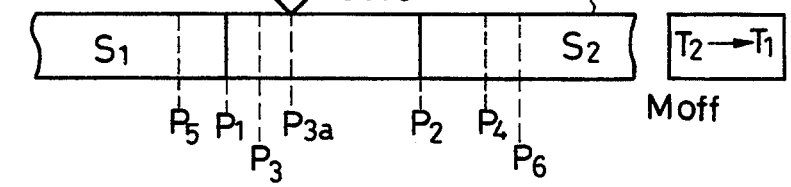

The read/write circuit 34 has not been muted during the above forward travel of the tape 14 in the playback mode from $P_{3a}$ to $P_6$ relative to the heads 30 and 32. The operator can therefore determine from the reproduced sound whether the amended position $P_{3a}$ is good for start marking. If it is, the operator may proceed to actuate the START MARK switch 130. Then the start marking routine will proceed from the node 156, FIG. 4B, to the block 158, FIG. 4D. Therefore, as has been set forth previously, the position of the heads 6 and 7 relative to the tape 14 will subsequently change as shown in FIGS. 6I–6K. Then a start mark will be written in the amended position $P_{3a}$.

I have so far described the operation of the digital audio tape apparatus 10 in terms of how a start mark is written in a selected position on the tape 14 between the two tunes $S_1$ and $S_2$ recorded thereon, with or without the amendment of the selected position. Essentially the same procedure may be followed for writing additional start marks between the other tunes that have been recorded on the tape 14.

Next comes the step of renumbering all the recorded tunes with serial program numbers. The operator may simply actuate the PROG. NO. switch 132, FIG. 1, to this end. The system controller 92 will then conventionally respond by locating the successive start marks in the selected positions $P_3$ or $P_{3a}$ on the tape 14 and by serially writing program numbers in these positions. The tape will be fast forwarded for locating the start marks.

Advantages

The advantages gained by my invention, as disclosed in detail hereinbefore, are as follows:

1. The time code data on the tape 14 is written on the RAM 114 when the operator actuates the POSITION SELECT switch 128, and is visually displayed on the windows 136 and 138 in hours, minutes, seconds and frames. This display remains unaltered despite the subsequent tape travel back and forth past the heads 30 and 32 until the writing of a start mark is completed. Accordingly, the operator can rely not only on his auditory sensation but also on the visual display of the selected position $P_3$ for the determination of whether this position is good for start marking.

2. When the position to be start marked is amended from $P_3$ to $P_{3a}$, too, the amended position is displayed in hours, minutes, seconds and frames. He can therefore determine whether or not the amended position is good for start marking, far more quickly and infallibly than heretofore.

3. The operator is required simply to actuate the FAST FORWARD switch 124 or the REVERSE switch 126 for amending the selected position $P_3$ in either of the opposite directions. A predetermined number (e.g. five) of frames is then added to, or subtracted from, the time code data $T_2$ that has been stored on the RAM 114, to provide the amended time code data $T_{2a}$ for display on the display means 134. There is therefore no need for actually running the tape for such amendment of the selected position $P_3$.

4. Whether the amended position Pa. is proper for start marking or not can be readily determined by initiating the optional position check subroutine of FIG. 4C before actuating the START MARK switch 130, the position check subroutine being initiated by simple actuation of the PLAY switch 120.

5. The optional position check subroutine may also be resorted to, again by simple actuation of the PLAY switch, in cases where no amendment of the selected position $P_3$ has been made, as illustrated in FIGS. 5D–5G.

6. The slightest changes in tape position, brought about by amendment of the selected position $P_3$ in either direction, can be visually displayed to the unit of frames.

7. The display windows 138, which have so far indicated program numbers only, are utilized for the indication of tape position in frames, so that the apparatus 10 is made no more complex in construction than heretofore.

8. The illumination of the indicia PNO over the program number display windows 138 goes off when these windows are displaying tape position in frames, so that no confusion is to arise as to their indications.

9. The muting circuit is automatically turned on and off during the progress of start marking operation, enabling the operator to hear the reproduction of the recordings as required and to quickly and accurately determine a position $P_3$ or $P_{3a}$ for start marking.

Possible Modifications

I do not wish my invention to be limited by the exact details of the foregoing disclosure, since a variety of modifications, alterations or adaptations may be made by those familiar with the digital audio tape and allied arts in the practice of my invention. The following is a brief list of such possible modifications, alterations and adaptations which I believe all fall within the scope of my invention:

1. Program numbers, instead of start marks, may be written directly in tape positions determined in accordance with my invention. Indeed, according to the broadest aspect of my invention, any desired control data including, but not limited to, start marks and program numbers may be written in such tape positions.

2. Such control data may be written by finding the beginnings of the recorded information segments, instead of by finding their ends as in the foregoing embodiment.

3. An additional switch or switches dedicated solely to the amendment of any selected position $P_3$ may be provided, instead of utilizing the FAST FORWARD and REVERSE switches for that purpose. The disadvantage of providing such an additional switch or switches will be compensated for by the greater ease of amendment.

4. The START MARK switch 130 may be dispensed with if the hardware of the apparatus is modified so that a start mark is written upon actuation of the RECORD switch 122.

5. A single switch, whatever it is, may be actuated in various ways for giving a required number of different commands needed for identifying a series of information segments in accordance with my invention.

6. The teachings of my invention may be practiced with digital audio tape apparatus of the kind having four heads, two for writing and the other two for reading.

What I claim is:

1. In a recording and reproducing apparatus of the type having transducer means for writing and reading information on a record medium, a method of writing control data such as start marks or program numbers in selected positions between segments of information that have been written one after another on the record medium, the record medium also having recorded thereon positional data representative of the position of the record medium with respect to the transducer means, which method comprises:

(a) audibly reproducing the information on the record medium;
(b) concurrently with step (a), visibly displaying on display means the varying current position of the record medium with respect to the transducer means on the basis of the positional data being read by the transducer means on the record medium;
(c) selecting a position on the record medium between two successive segments of information thereon in response to the actuation of a position select means;
(d) writing on memory means the positional data that is read by the transducer means when the position select means is actuated at step (c) and which, therefore, represents the selected position on the record medium;
(e) visibly displaying on the display means the selected position on the record medium on the basis of the positional data written on the memory means at step (d);
(f) continuing the audible reproduction of the information on the record medium for a preassigned time after the actuation of the position select means at step (c), with the display means continuously displaying the selected position on the record medium in the face of such continued reproduction;
(g) relatively returning the transducer means to the selected position on the record medium; and
(h) writing desired control data in the selected position on the record medium.

2. The method of claim 1 wherein the selected position is continuously displayed until the control data is written in the selected position on the record medium.

3. The method of claim 1 further comprising a series of position check steps, to be optionally interposed between steps (f) and (g) of claim 1, for making sure that the selected position on the record medium is good for writing the control data, the position check steps comprising:
 (1) relatively returning the transducer means to the selected position on the record medium, with the display means maintained to display the selected position; and
 (2) audibly reproducing the information on the record medium for a preassigned time from the selected position, with the display means still maintained to display the selected position.

4. The method of claim 1 further comprising a series of amendment steps, to be optionally substituting for steps (g) and (h) of claim 1, for amending the selected position on the record medium, the amendment steps comprising:
 (1) amending the positional data that has been stored on the memory means at step (d) of claim 1, with the relative positions of the transducer means and the record medium maintained the same as when the audible reproduction of the information was stopped upon lapse of the preassigned time after the actuation of the position select means at step (f) of claim 1, the thus amended positional data on the memory means being representative of an amended position on the record medium which is displaced from the selected position to a predetermined degree in either of two opposite directions;
 (2) visibly displaying on the display means the amended position on the record medium on the basis of the amended positional data on the memory means;
 (3) relatively returning the transducer means to the amended position on the record medium, with the display means maintained to display the amended position on the record medium; and
 (4) writing the desired control data in the amended position on the record medium.

5. The method of claim 4 further comprising a series of position check steps, to be optionally interposed between steps (2) and (3) of claim 4, for making sure that the amended position on the record medium is good for writing the control data, the position check steps comprising:
 relatively returning the transducer means to the amended position on the record medium, with the display means maintained to display the amended position; and
 audibly reproducing the information on the record medium for a preassigned time from the amended position, with the display means still maintained to display the amended position.

6. In a recording and reproducing apparatus of the type having transducer means for writing and reading information on a record medium, a method of writing control data such as start marks or program numbers in selected positions between segments of information that have been written one after another on the record medium, the record medium also having recorded thereon positional data representative of the position of the record medium with respect to the transducer means, which method comprises:
 (a) audibly reproducing the information on the record medium;
 (b) concurrently with step (a), visibly displaying on display means the varying current position of the record medium with respect to the transducer means on the basis of the positional data being read by the transducer means on the record medium;
 (c) selecting a position on the record medium between two successive segments of information thereon in response to the actuation of a position select means;
 (d) writing on memory means the positional data that is read by the transducer means when the position select means is actuated at step (c) and which, therefore, represents the selected position on the record medium;
 (e) visibly displaying on the display means the selected position on the record medium on the basis of the positional data written on the memory means at step (d);
 (f) stopping the audible reproduction of the information on the record medium;
 (g) optionally, amending, by actuating amendment means, the positional data that has been stored on the memory means at step (d) with the relative positions of the transducer means and the record medium left unchanged from step (f), the thus amended positional data on the memory means being displayed on the display means and being representative of an amended position on the record medium which is displaced from the selected position to a predetermined degree in either of two opposite directions;
 (h) relatively returning the transducer means to the selected position or to the optionally amended position on the record medium, with the display means maintained to display the selected position or the optionally amended position on the record medium; and (i) writing desired control data in the selected position or in the optionally amended position on the record medium.

7. The method of claim 6 further comprising a series of position check steps, to be optionally interposed between steps (f) and (h), or steps (g) and (h), of claim 6, for making sure that the selected position or the optionally amended position on the record medium is good for writing the control data, the position check steps comprising:

relatively returning the transducer means to the selected position or to the optionally amended position on the record medium, with the display means maintained to display the selected position or the optionally amended position; and audibly reproducing the information on the record medium for a preassigned time from the selected position or from the optionally amended position, with the display means still maintained to display the selected position or the optionally amended position.

8. In a recording and reproducing apparatus of the type having transducer means for writing and reading information on a tape medium, a method of writing as start marks in selected positions between tunes or like segments of information that have been recorded one after another on the tape medium, preparatory to the writing of serial program numbers in such selected positions, the tape medium also having recorded throughout its length time code data representative of the position of the record medium with respect to the transducer means in hours, minutes, seconds and frames, which method comprises:

(a) audibly reproducing the information on the tape medium;

(b) concurrently with step (a), visibly displaying on first display means the varying current position of the tape medium with respect to the transducer means in hours, minutes and seconds on the basis of the time code data being read by the transducer means on the tape medium;

(c) also concurrently with step (a), visibly displaying on second display means a program number, if any, of each segment of information being reproduced;

(d) selecting a position on the tape medium between two successive segments of information thereon in response to the actuation of a position select means;

(e) writing on memory means the time code data that is read by the transducer means on the tape medium when the position select means is actuated at step (d) and which, therefore, represents the selected position on the tape medium;

(f) visibly displaying the selected position on the tape medium in hours, minutes and seconds on the first display means, and in frames on the second display means, on the basis of the time code written on the memory means at step (e);

(g) continuing the audible reproduction of the information on the tape medium for a preassigned time after the actuation of the position select means at step (d), with the first and the second display means continuously displaying the selected position on the tape medium in the face of such continued reproduction;

(h) relatively returning the transducer means to the selected position on the tape medium; and (i) writing a start mark in the selected position on the tape medium.

9. The method of claim 8 further comprising a series of amendment steps, to be optionally substituted for steps (h) and (i) of claim 8, for amending the selected position on the tape medium, the amendment steps comprising:

actuating amendment means for causing a prescribed number of frames to be added to, or subtracted from, the time code data that has been stored on the memory means at step (e) of claim 8, with the relative positions of the transducer means and the tape medium maintained the same as when the audible reproduction of the information was stopped upon lapse of the preassigned time after the actuation of the position select means at step (g) of claim 8, the thus amended time code data on the memory means being representative of an amended position on the tape medium which is displaced from the selected position to a predetermined degree in either of two opposite directions;

visibly displaying the amended position on the tape medium n hours, minutes and seconds on the first display means, and in frames on the second display means, on the basis of the amended time code data on the memory means; and relatively returning the transducer means to the amended position on the tape medium, with the first and the second display means maintained to display the amended position on the tape medium; and writing a start mark in the amended position on the tape medium.

10. In a recording and reproducing apparatus of the type having transducer means for writing and reading information on a relatively moving record medium, a system for writing control data such as start marks or program numbers in selected positions between segments of information that have been recorded one after another on the record medium, the record medium also having recorded thereon positional data representative of the position of the record medium with respect to the transducer means, the system comprising:

(a) drive means for creating a relative bidirectional scanning motion between the transducer means and the record medium;

(b) position select means to be actuated for selecting a position on the record medium between any two successive segments of information thereon when the transducer means relatively comes to a selected position on the record medium in the course of audible reproduction of the recorded information;

(c) memory means for storing the positional data that is read on the record medium by the transducer means when the position select means is actuated and which, therefore, represents the selected position on the record medium;

(d) display means for normally visibly displaying the current position of the record medium with respect to the transducer means on the basis of the positional data being read by the transducer means on the record medium and, upon actuation of the position select means, for visibly displaying the selected position on the record medium on the basis of the positional data stored on the memory means; and (e) programmable controller means connected to all of the drive means and the position select means and the memory means and the display means for causing the audible reproduction of the information to be continued for a preassigned time after the actuation of the position select means, then for causing the drive means to relatively return the transducer to the selected position on the record medium, and then for causing the transducer means to write desired control data in the selected position on the record medium, with the display means maintained to display the selected position on the record medium until the control data is written in the selected position.

11. The system of claim 10 further comprising amendment means connected to the controller means, the amendment means being actuated manually for amending the positional data that has been stored on the memory means, with the relative positions of the transducer means and the record medium left unchanged, the thus amended positional data on the memory means being representative of an amended position on the record medium which is displaced from the selected position to a predetermined degree in either of two opposite directions, the controller means being responsive to the actuation of the amendment means for causing the display means to display the amended position on the record medium on the basis of the amended positional data on the memory means, then for causing the drive means to relatively move the transducer means to the amended position on the record medium, and then for causing the transducer means to write the desired control data in the amended position, with the display means maintained to display the amended position until the control data is written in the amended position.

12. The system of claim 11 wherein the amendment means comprises:
   a first switch to be actuated for shifting the selected position on the record medium in one of two opposite directions; and
   a second switch to be actuated for shifting the selected position on the record medium in the other of the opposite directions.

13. In a recording and reproducing apparatus of the type having transducer means for writing and reading information on a relatively moving tape medium, a system for writing start marks in selected positions between tunes or other segments of information that have been recorded one after another on the tape medium, preparatory to the writing of serial program numbers in such selected positions, the tape medium also having recorded throughout its length time code data representative of the position of the tape medium with respect to the transducer means in hours, minutes, seconds and frames, the system comprising:
   (a) drive means for creating a relative bidirectional scanning motion between the transducer means and the tape medium;
   (b) a position select switch to be actuated for selecting a position on the tape medium between any two successive segments of information thereon when the transducer means relatively comes to a selected position on the tape medium in the course of audible reproduction of the recorded information;
   (c) memory means for storing the time code data that is read on the tape medium by the transducer means when the position select switch is actuated and which, therefore, represents the selected position on the tape medium;
   (d) first display means for normally displaying in hours, minutes and seconds the current position of the record medium with respect to the transducer means on the basis of the time code data being read by the transducer mean son the tape medium and, upon actuation of the position select switch, for visibly displaying in hours, minutes and seconds the selected position on the tape medium on the basis of the time code stored on the memory means;
   (e) second display means for normally visibly displaying a program number, if any, of each segment of information on the tape medium and, upon actuation of the position select switch, for visibly displaying in frames the selected position on the tape medium on the basis of the time code data stored on the memory means; and
   (f) programmable controller means connected to all of the drive means and the position select switch and the memory means and the first and the second display means for causing the audible reproduction of the information to be continued for a preassigned time after the actuation of the position select switch, then for causing the drive means to relatively return the transducer to the selected position on the tape medium, and then for causing the transducer means to write a start mark in the selected position on the tape medium, with the first and the second display means maintained to display the selected position on the tape medium until the start mark is written in the selected position.

14. The system of claim 13 further comprising amendment means to be actuated manually for amending, in either of two opposite directions, the position selected on the tape medium by the actuation of the position select switch, the controller means being connected to the amendment means for causing a prescribed number of frames to be added to, or subtracted from, the time code data on the memory means upon actuation of the amendment means, with the relative positions of the transducer means and the tape medium left unchanged, the controller means being also responsive to the actuation of the amendment means for causing the first and the second display means to display the amended position in hours, minutes, seconds and frames on the basis of the amended time code data on the memory means, then for causing the drive means to relatively move the transducer means to the amended position on the tape medium, and then for causing the transducer means to write a start mark in the amended position, with the first and the second display means maintained to display the amended position until the start mark is written in the amended position.

15. The system of claim 14 wherein the amendment means comprises:
   a first amendment switch to be actuated for causing the prescribed number of frames to be added to the time code data on the memory means; and
   a second amendment switch to be actuated for causing the prescribed number of frames to be subtracted from the time code data on the memory means.

* * * * *